United States Patent [19]

Tallman

[11] Patent Number: 4,482,956
[45] Date of Patent: Nov. 13, 1984

[54] PARALLEL QUEUEING METHOD

[75] Inventor: Peter H. Tallman, Poughkeepsie, N.Y.

[73] Assignee: International Business Machines Corporation, Armonk, N.Y.

[21] Appl. No.: 438,993

[22] Filed: Nov. 4, 1982

[51] Int. Cl.³ .............................................. G06F 1/00
[52] U.S. Cl. .................................. 364/300; 364/200
[58] Field of Search ............... 364/200 MS File, 300

[56] References Cited

U.S. PATENT DOCUMENTS 4,271,468 6/1981 Christensen et al. ............... 364/200

Primary Examiner—Raulfe B. Zache
Attorney, Agent, or Firm—Bernard M. Goldman

[57] ABSTRACT

Each embodiment enables a single chained queue to have parallel operations by plural element insertion routines and one deletion routine which may be simultaneously executing asynchronously on plural processors for deleting an element, while inserting one or more anchor-pointed elements. This is done by providing a dequeueing lock which is only examined by a program routine which is to delete an element, but is not examined by any program routine which is to make an insertion of an anchor-pointed element into the queue using a System/370 compare and swap instruction. The embodiments provide efficient processing in a non-pure LIFO queue, which is non-pure because the queue can, at the user's option, be used for either LIFO or non-LIFO dequeueing. No lock is used on the queue when inserting anchor-pointed elements. A special case of non-LIFO processing is FIFO (first-in/first-out) processing, which finds the last element in the queue as the required element.

6 Claims, 9 Drawing Figures

FIG. 3  LIFO ELEMENT INSERTION ROUTINE

PRIOR ART

FIG. 8 (MORE THAN ONE ELEMENT IN Q, & NO MATCH ON ANCHOR-POINTED ELEMENT)

PARALLEL QUEUEING METHOD

INTRODUCTION

This invention relates to methods for improving the operating efficiency of a multiprocessor (MP) data processing system by allowing plural programs on different processors in the MP to make insertions and deletions in a queue in parallel while executing asynchronously.

BACKGROUND

Queues are commonly used in past and current data processing systems. Some queues have been managed by hardware logic circuitry and other queues have been managed by programmed or microprogrammed routines. A large number of queues are commonly used by system control programs to control the reusable hardware and software resources of a data processing system, including queues which are themselves system resources.

Each queue is generally comprised of a plurality of entries (often called "elements") in which each element is a unit of the queue. For example, a queue may be used in a system to keep track of all I/O devices currently in the process of reading or writing a record, and at any given time the queue may have anywhere from no elements (indicating no I/O device is in use) to a large number of elements (indicating a large number of I/O devices are in use). Another example is a queue used to receive all user requests for the use of a supervisory dispatcher program (which is a system resource that allocates CPUs to user program tasks ready to be executed).

Queues may be classified into two general types according to the relative locations of the elements in the queue; and they are: (1) contiguous queues with elements physically located next to each other, and (2) chained queues with elements that can be physically dispersed anywhere in main storage (MS). An example of a contiguous queue is shown in an article entitled "First-In/First-Out Queueing Technique Using Compare and Swap" by M. Taradalsky on page 1547 of Vol. 18, No. 5, October 1975, in the IBM Technical Disclosure Bulletin.

The subject invention does not deal with contiguous queues, but deals only with chained queues and more particularly, only with single threaded chained queues having an anchor. Each chained queue has an anchor block at a predetermined location in main storage for controlling the queue. The anchor block contains an address (called an anchor pointer) which addresses the chain of elements comprising the queue, in which each element contains a pointer to a next element in the queue. The last element in the queue chain has an indicator code (often all zeroes) in its pointer location to identify it as the last element. If there is no element currently in the queue (i.e. the queue is empty), the anchor pointer contains an empty code (e.g. all zeroes) in the location of the anchor pointer.

Elements are inserted into, or deleted from, the queue by altering its anchor block. The easiest and fastest insertion and deletion is done by changing the anchor pointer itself, wherein insertion involves changing the anchor pointer to the address of a new element being put into the queue, and deletion involves changing the anchor pointer to the pointer in the element addressed by the anchor pointer. The first element in the queue (addressed directly by the anchor pointer) may be called the anchor-pointed element. A last-in/first-out (LIFO) queue operation inserts and deletes the anchor pointed element in a queue. The anchor pointed element is the newest and last element in a LIFO queue, and it is the candidate element for being dequeued.

However many data processing activities cannot use a LIFO queue operation and require some other type of dequeueing selection, such as first-in/first-out (FIFO) selection, or some other type of non-LIFO dequeueing selection.

The subject invention is primarily directed to chained queue operations requiring other than pure LIFO dequeueing selection, even though this invention may be used for LIFO dequeueing selection in combination with non-LIFO dequeueing selection.

Multiprocessing (in which two or more processors, e.g. CPUs, can simultaneously and asynchronously be executing separate instruction streams in relation to a shared MS) has been recognized in the prior art to present special problems for changing a queue in MS shared by the two or more processors. For example, it has been recognized that it is undesirable for a second processor to attempt to insert or delete an element in a queue before a first processor has completed the insertion or deletion of another element in the queue, wherein no processor should take action based on incompleted changes in the queue by another processor which would adversely affect the integrity of the queue or information obtained therefrom.

This MP problem has been generally solved in two different ways in the prior art. The first prior solution puts a lock on the queue which serializes all of its programs using the queue, so that only one program can access the queue at any given time. Such locking operation is supported by the S/370 Test and Set (TS) or Compare and Swap (CS or CDS) instruction operation on a queue lock field to prevent MP interference in accessing the lock field for selecting a program for using the queue. Programming convention among all programs using the queue requires all programs to voluntarily test the lock field and honor its state before attempting to change the queue, and only one program is selected to set on the lock field and then to change the queue. When the selected program is done changing the queue for a FIFO or non-FIFO operation, it changes the lock field to indicate an unlocked state so that another program can then set the lock on and use the queue. With this technique, only a single insertion operation or a single deletion operation can be done at a time, and simultaneous operations on the queue are not possible.

A prior shared/exclusive locking method for MP is disclosed in an article entitled "Shared Locking Without A Lock" by M. Taradalsky on page 1545 of Vol. 18, No. 5, October 1975 of the IBM Technical Disclosure Bulletin. However, the lock associated with the subject invention is not concerned with shared locking.

The second prior solution does not use any lock on the queue and applies only to queues always used as LIFO queues. A LIFO queue enables parallel requests from different programs on plural CPUs to enqueue and dequeue anchor pointed elements on a single queue, while maintaining the integrity of the queue which is of foremost importance. The second solution uses the IBM System/370 CS or CDS instruction directly on the queue anchor pointer to accomplish the element insertion or deletion of the anchor-pointed element. Background on this second solution's use of the Compare and Swap instruction on a queue element is found in the IBM System/370 Principles of Operation (GA22-7000-8) pages 7-12 to 7-14 and its Appendix A pages A40 to A46, in particular the section entitled "Free-Pool Manipulation". The Compare and Swap instruction is provided in two forms for handling either a single word field (CS instruction) or a double word field (CDS instruction); and the size of queue anchor field(s) (i.e. one word or two words) determines the use of CS or CDS for a single element insertion or deletion operation on a queue. During the CS or CDS instruction execution, no processor in a MP can interfere with a enqueueing or dequeueing operation being done by another processor, provided the field(s) being handled have the size limitation of the respective instruction, and provided that the instruction is used properly.

All queue management programs have available the main storage address of the queue anchor pointer as a displacement D2 from the current content of a specified base general register B2. Each queue management routine must then set up the operands for the CS or CDS instruction, which include loading any available general register R1 with the contents of the storage location identified by the effective address of D2(B2), which is the current anchor pointer content that addresses the first queue element. A LIFO insertion routine must initially set up the new element which later is to be inserted in the queue, store the anchor pointer in it as the element's pointer, and store the address of the element into a general register R3. A LIFO deletion routine must initially store into a general register R3 the content of the pointer within the anchor pointed element to be deleted from the queue. Then the Compare and Swap instruction CS is executed in an attempt to effect the requested insertion or deletion. When executed, the CS instruction tests R1 to determine if the content of the anchor pointer has changed: and if not, the address in R3 is stored into the anchor pointer to cause the insertion or deletion of the anchor pointer element to take place in the queue. If CS or CDS execution finds the anchor pointer has changed since R1 was set up, the insertion or deletion attempt fails, but R1 is reloaded with the current anchor pointer. A condition code (CC) for the CS instruction indicates if its execution succeeded or failed.

Experience has taught that great risk exists for destroying the queue during enqueueing and dequeueing operations when only the anchor pointer is swapped by a CS instruction for an insertion or deletion element in LIFO operations.

The integrity risk is that: (1) while a first program is attempting to dequeue a single element then on the queue after finding the pointer is zero in the anchor-pointed element; (2) a second program dequeues that element, inserts a new element, and then reinserts the element it had previously dequeued as a new anchor-pointed element; (3) all before the first program executes its CS instruction. In this case, the first program then executes its CS instruction successfully, because it will compare equally with the reinserted anchor-pointer. Unfortunately in this case, the CS instruction of the first program will insert an all zero field in the anchor-pointer to indicate an empty queue, because the first program is unaware that another element had been put into the queue in the interim period. That zero anchor pointer destroys the queue because it breaks the pointer chain and thereby ignores the existence of an element on the queue, which is then not empty.

A high risk queue is a useless queue in a high speed data processing system, because queue failure will most likely cause the data processing operation to stop or to produce erroneous results. The detection of this type of software failure may be difficult to find and correct, resulting in expensive down time for the system.

This significant risk to queue integrity has been found in the prior art to be relieved by the addition of a counter field which is in the anchor located contiguously with the anchor-pointer, in which each is a one word field and they are swapped as a unit by a CDS instruction.

The CS or CDS instruction is followed by a conditional branch instruction which tests the condition code of the executed CS or CDS instruction to determine if the requested element insertion or deletion was successful. If unsuccessful, the routine loops back to again revalidate the R3 content and then re-execute the CS or CDS instruction, and if necessary repeat the looping back until the CS or CDS execution is successful.

The following prior art System/370 assembler language coding taken from the IBM System/370 Principles of Operation provides examples of insertion and deletion queue management routines which include a count value with the anchor pointer, wherein the use of the count value is essential to the integrity of the queue. The CDS instruction allows a word size anchor pointer and a contiguous word size count value to be stored into the queue anchor block as a unit on a successful execution of the CDS instruction.

Element Insertion Routine

Initial Conditions:

GR0 will be loaded with the anchor pointer.
GR1 will be loaded with the counter value.
GR2 contains the address of the element to be added.
GR3 will contain the decremented counter value.
GR4 contains the address of the anchor pointer.

| ADDQ | LM | 0,1,0(4) | GR0,GR1 = contents of the anchor pointer and counter. |
|---|---|---|---|
| TRYAGN | ST | 0,0,(2) | Point the new element to the current top element in the list. |
| | LR | 3,1 | Move the counter to GR3. |
| | BCTR | 3,0 | Decrement the counter. |
| | CDS | 0,2,0(4) | Update the anchor pointer and counter. |
| | BNE | TRYAGN | |

Element Deletion Routine

Initial Conditions:

GR4 contains the address of the anchor pointer.
GR0 will contain the address of the anchor pointed element to be deleted.
GR1 will contain the unchanged counter value.
GR2 will be loaded with the anchor pointer.
GR3 will be loaded with the changed counter value.

| DELETQ | LM | 2,3,0,(4) | GR2,GR3 = contents of the anchor pointer and counter. |
|---|---|---|---|
| TRYAGN | LTR | 2,2 | Is the list empty? |
| | BZ | EMPTY | Yes, get help. |
| | L | 0,0(2) | No, GR0 = the pointer from the last entered element (N). |
| | LR | 1,3 | Move the counter to GR1. |
| | CDS | 2,0,0(4) | Update the anchor pointer and counter. |
| | BNE | TRYAGN | |
| USE | (Any Instruction) | | The address of the removed |

| Element Deletion Routine | |
| --- | --- |
| Initial Conditions: | |
| | element is in GR2 = R1. |

A CPU is considered to be in the process of inserting or deleting an element on a queue from the time it begins executing an element insertion or deletion routine until each routine finds the condition code of its CS or CDS instruction to be zero, indicating its insertion or deletion was successful. Thus, several programs on different CPUs in a MP can be simultaneously executing insertion or deletion programs on the same LIFO queue with contention causing looping in some of the routines until the contention ends for each routine when its CS or CDS instruction is executed successfully.

An example of interference can be visualized by having two CPUs concurrently executing queue management routines on the same LIFO queue. Either CPU may be attempting insertion or deletion on the LIFO queue asynchronous in that neither CPU knows that the other is attempting to access the LIFO queue, i.e. there is no synchronizing communication signaling between them. Suppose the first CPU routine has begun execution by setting up its operands, but has not yet executed its CDS instruction when the second CPU routine has successfully executed its CDS instruction to obtain a successful insertion or deletion of the current anchor pointed element, which changes the content of the anchor pointer at storage location D2(B2). Then when the first CPU routine executes its CDS instruction, it will be unsuccessful because the actual anchor pointer at D2(B2) or the counter, will compare unequal with the previously loaded anchor pointer in R1 or the counter in R1+1. However, the unsuccessful CDS execution will reload R1 with the new actual pointer value in preparation for the next CDS execution attempt by the first CPU. If the actual pointer value and counter at D2(B2) has not changed from the R1 and R1+1 content at the time of the next CDS execution, it will then be successful. Accordingly, the CDS instruction operation prevents an improper queue changed by requiring all essential conditions in order to maintain the integrity of the LIFO queue under interference situations. Prior art queue management programs have been doing these insertion and deletion routines for many years for LIFO queue operation without any lock on the queue, because this type of programming has permitted parallel LIFO insertion and deletion operations by plural programs and CPUs. Unfortunately, this type of unlocked queue operation cannot be used for non-LIFO queue operation, such as FIFO (first-in, first-out) operations.

In the prior art, certain FIFO operations have been done by using two queues which duplicate the same elements, in which one queue (i.e. input queue) is used for inserting elements and the other queue (i.e. output queue) is used for deleting elements. This technique has been used in the IEAVEDS0 and IEAVESC1 modules in a prior IBM MVS program. Elements can be inserted efficiently on the input queue by plural CPUs without queue integrity loss without then locking the input queue by using the above described compare and swap techniques for inserting each new anchor pointed element in the first queue, as explained above for LIFO element insertion. When certain conditions occur (e.g. maximum input queue size is reached or the output queue is empty), both queues are locked, further use of both queues is prevented and all elements of the first queue are removed, reordered into a FIFO sequence (e.g. by reversing its pointer chain), and then inserted into the second queue (i.e. the output queue) which is located in main storage by a second queue anchor. Output from the first queue and input to the second queue are locked during this queue reorganization process. The output queue thereafter maintains an insertion lock to prevent insertion but allows FIFO dequeuing (deletion) without a dequeueing lock by dequeuing the anchor pointed element. Hence, no new element can be inserted into the second queue while it is being emptied. The only elements that may be inserted into the second queue are those provided from the first queue under lock control.

SUMMARY OF THE INVENTION

The invention enables parallel operations in a single chained queue by element insertion routines that are simultaneously executing on plural processors while an element deletion routine on any processor may be simultaneously removing any element on the queue. That is, in a single chained queue in main storage, one processor in an MP may execute a programmed routine for finding and deleting any element in combination with any number of other processors simultaneously executing programmed routines for inserting anchor-pointed elements. A dequeueing lock is set on during the deletion processing for an element and does not affect combined parallel processing of one or more routines for enqueueing anchor-pointed elements.

The non-LIFO locked dequeueing processing of a non-anchor pointed element involves searching the queue (beginning with the anchor pointer) for the requested non-anchor pointed element and outputting the pointer to it in its prior element in the queue sequence as the address of the dequeued element. Then it is dequeued by moving into the prior element the pointer within the dequeued element. This deletes the dequeued element from the queue by changing its prior element pointer to address the queue element that followed the dequeued element in the queue sequence.

The locked dequeueing of an anchor-pointed element involves changing the anchor pointer to address the queue element that followed the anchor-pointed element being dequeued in the queue sequence, and outputting the address of the anchor-pointed element being dequeued.

An important special case of non-LIFO processing is FIFO (first-in/first-out) processing, which finds the last element in the queue as the required element. The last element is conventionally identified by an end-of-queue code in its pointer field, which is looked for and dequeued during a FIFO operation.

The invention provides efficient processing in a non-pure LIFO queue, which is non-pure because the queue can, at the user's option, be used for either LIFO or non-LIFO dequeueing. The invention does not use any lock on the queue when inserting anchor pointed elements on the queue, for which queue integrity is maintained by using the System/370 compare and swap instruction in a manner similar to the way this instruction has been used in the prior art for inserting and deleting anchor-pointed elements in prior pure LIFO queues.

Objects of this invention are to provide a queue management method for multiprogramming and/or multiprocessing operations for:
1. Eliminating the queue integrity risk without using a counter field while increasing the efficiency of operation of a single queue operating as both a non-LIFO queue and a LIFO queue, i.e. a non-pure LIFO queue.
2. Enabling one user program to obtain non-LIFO dequeueing of an element while one or more other user programs are concurrently enqueueing anchor-pointed elements on the same queue.
3. Providing a non-LIFO queue output lock that allows dequeueing of any non-anchor pointed queue element or of the anchor-pointed element by any CPU while other simultaneously executing programs on any CPU may be enqueueing one or more anchor-pointed elements on the same queue in main storage without risk of destruction of the queue.
4. Providing a queue which can efficiently operated as both a non-LIFO queue and a LIFO queue that allows deletion processing of any element in parallel with the processing of one or more anchor-pointed elements being inserted in the queue.
5. Providing a single queue that allows efficient parallel element enqueueing and dequeueing operations wherein different types of LIFO and non-LIFO dequeueing functions can be performed arbitrarily by any program and without risk of queue degradation.
6. Enabling parallel LIFO and non-LIFO operations on a queue without requiring a counter in a queue anchor block for maintaining queue integrity during the enqueuing and dequeueing operations, as was previously required to insure queue integrity using the S/370 compare double and swap instruction. cl BRIEF DESCRIPTION OF THE DRAWINGS FIG. 1 is a diagramatic representation of CPU queue modification parallelism enabled by the invention.

FIGS. 7 and 8 represent a method embodiment of the invention for mixed LIFO and non-LIFO dequeueing of elements in a single queue using search arguments.

BACKGROUND LIFO ROUTINES

Figure 3:
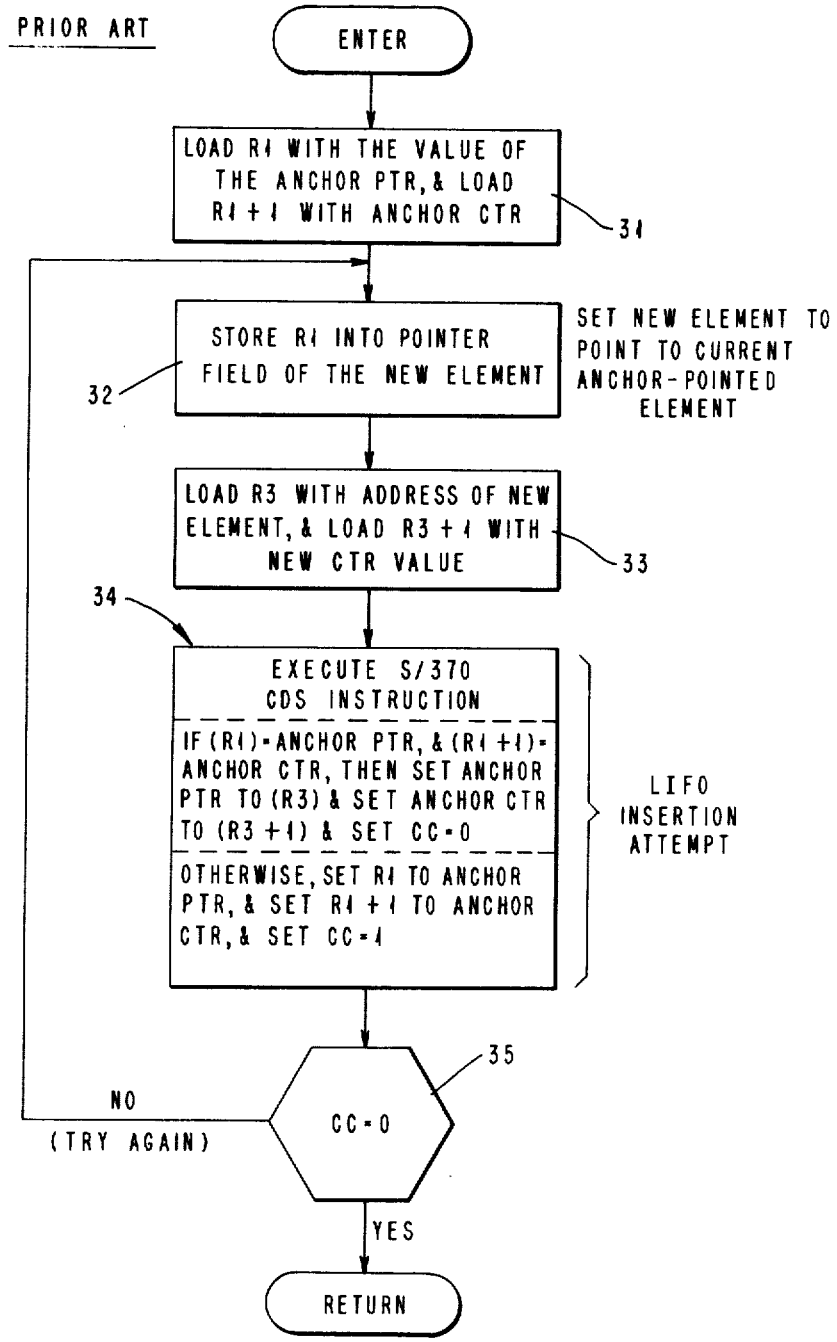
FIGS. 3 and 4 are flow diagrams of prior art enqueueing and dequeueing routines.
Figure 4:
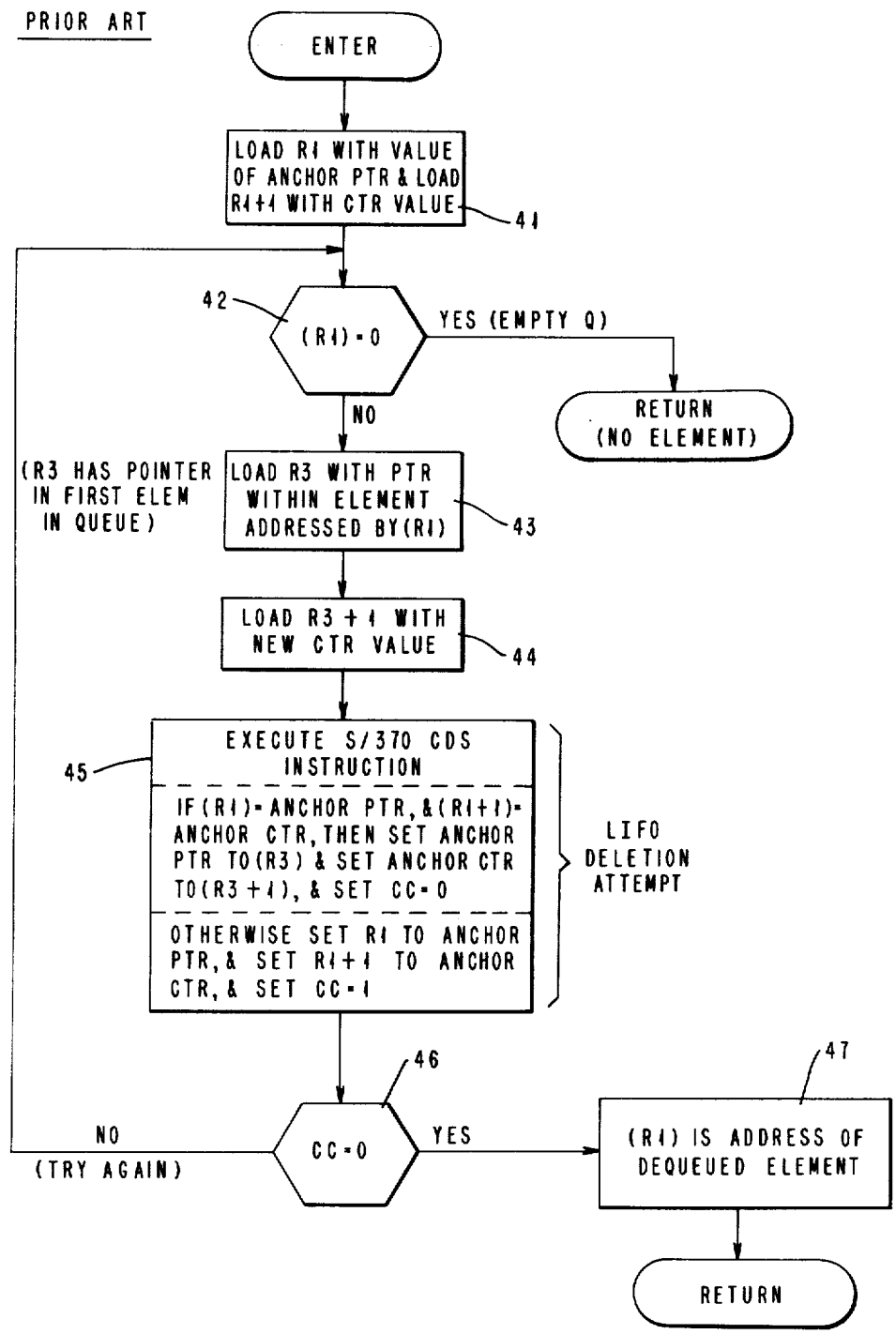

FIGS. 3 and 4 show flow diagrams of prior art LIFO enqueueing and dequeueing routines provided in the Introduction Background section of this specification which may be used in conventional queue operations to insert a new anchor-pointed element or delete the current anchor-pointed element in a LIFO queue. These routines are inserted in programs that require queue services.

In FIG. 3, element insertion is obtained by successful execution of the compare double and swap (CDS) instruction executed in step 34 in a given CPU. It compares the loaded anchor-pointer in R1 and the loaded anchor counter in the next general register R1+1 (previously loaded by step 31, or by step 34 in a prior iteration of the routine to the anchor-pointer and counter located at D2(B2) in MS) to the actual anchor-pointer and counter now existing in the anchor to determine if they are still the same (indicating no other routine has made an insertion or deletion in the queue during the time between the loading of R1 and R1+1, setting up the pointer in the new element by step 32, and the execution of CDS by step 34 in the respective routine). If the content of R1 and R1+1 are still the same as at D2(B2) at the time of execution of the CDS instruction, it stores into anchor-pointer 20 in MS the address of the new element from register R3 and the incremented counter value from R3+1, and sets condition code 0 in that CPU. However, if the content of R1 and R1+1 then differ from the actual anchor-pointer and counter at D2(B2), then the CDS instruction will instead load registers R1 and R1+1 with the actual anchor-pointer and counter at address D2(B2), and set condition code 1 in that CPU.

Register R3 was previously set up by step 33 with the address of the new element to be inserted, and its adjacent general register R3+1 was set up with the value of the anchor counter incremented by one.

The respective routine uses a conditional branch instruction in step 35 to test the condition code (CC) which is zero if the insertion occurred. If CC is found to be 1, the element insertion did not occur, and the routine branches back to step 32 in a new iteration to set the new element pointer to the new anchor-pointer, and set 33 redetermines the incremented counter value in R3+1, and then step 34 re-executes the CDS instruction for another attempted insertion which may be successful or not. The routine will thereby execute the CDS instruction one or more times until it makes the required insertion, which will be signalled by a zero condition code.

In FIG. 4, when the dequeueing routine is entered by a calling program, general register R1 is initially loaded with the anchor pointer as was done by step 31 in FIG. 3. However, in FIG. 4, a next general register R1+1 is also loaded with the counter value (that will be incremented each time an element is enqueued or dequeued from the queue). Then step 42 determines if the queue is empty (i.e. has no elements), since no element can be deleted from an empty queue. If the queue is empty, an all zero value is found in the anchor-pointer. Hence, step 42 tests for an all zero value in the anchor-pointer and continues the deletion operation with step 43 only if the queue is not empty, i.e. has one or more elements.

Step 43 loads R3 with the current pointer value in the anchor-pointed element, which is addressed by the content of R1. Step 44 loads the next general register R3+1 with a new counter value, which is the counter value taken from the anchor counter field and incremented by one.

Then step 45 executes the CDS instruction, which tests if the value in R1 and the counter value in R1+1 are still the same as the anchor-pointer and counter values at D2(B2) in MS to determine if any other program intervened to change the actual anchor-pointer, e.g. made an element insertion or deletion. The following step 46 tests the resulting condition code to determine if the CDS execution made the insertion or not. If CC is zero, the deletion was made, and the anchor contains the new pointer and the new counter value. Step 47 indicates the address in R1 represents the dequeued element, and R1 contains the output of the dequeueing operation when the routine returns to its calling program.

However, if step 46 indicates CC is one, the insertion was not made but the CDS instruction had loaded R1 with the values of the current actual anchor-pointer and counter, and a conditional branch is made back to step 42 to retest the empty status of the queue, since it is possible that an intervening program had emptied the queue. The method repeats for a non-empty queue until the deletion is made, step 47 outputs the dequeued element address, and a return is made to the calling program.

The counter is used along with the anchor-pointer to guard against multiple dequeue and enqueue operations by another CPU intervening between steps 43 and 44, which might leave the value of the anchor-pointer the same but with a new value in the pointer field of the anchor-pointed element. The guard against such possibility, the CDS instruction is used to adjust the counter value of each enqueue or dequeue and to compare for a new counter value at step 44. An unequal counter value on the CDS compare will cause CC=one, which causes step 46 to go to step 42 to try the operation again.

DESCRIPTION OF THE PREFERRED EMBODIMENT

Figure 1:
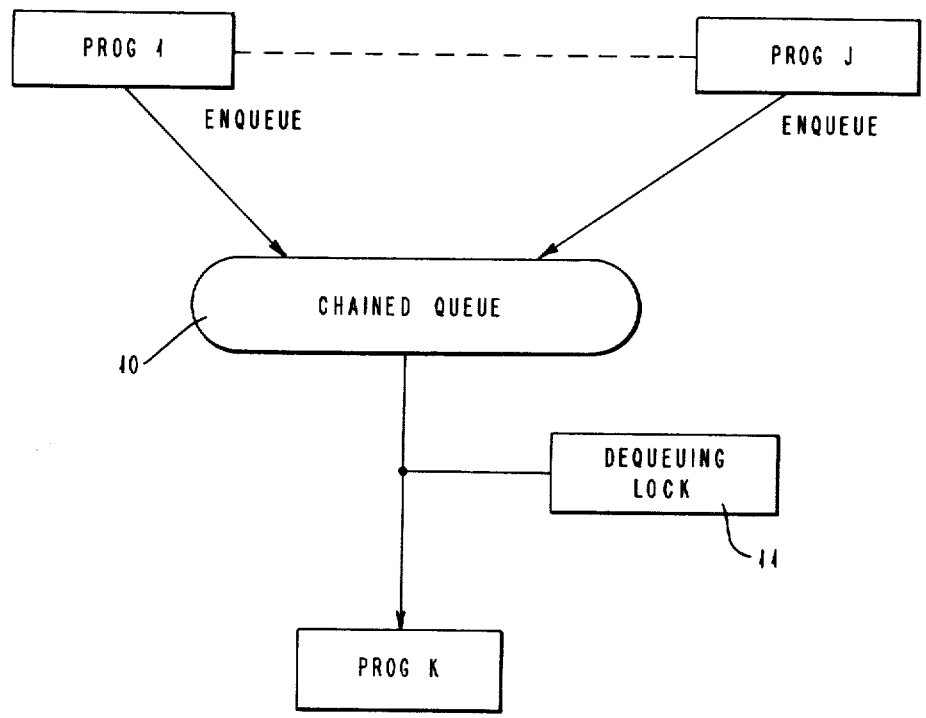

FIG. 1 represents symbolically the general operation of the invention on a single chained queue 10, which may have its elements scattered around the main storage (MS) of a multiprocessor (MP) data processing system having a plurality of programs (1 through K) executing on a plurality of CPUs which share queue 10. Programs 1 through J can simultaneously be in the process of inputting (i.e. inserting or enqueueing) elements into queue 10, while program K can be simultaneously dequeueing one or more elements from the same queue 10, possibly including the anchor-pointed element.

No anchor counter field is provided for queue 10, because this invention can maintain the queue integrity without a counter field during parallel enqueueing and dequeueing operations.

None of the element inputting programs 1 through J use any lock on queue 10, and each of these programs uses a S/370 CS instruction to insert an element at the anchor end of the queue. However, program K must obtain an output lock 11 before it can execute its dequeueing operation. Program K need not use any CS or CDS instruction to delete its element(s) except to dequeue the anchor-pointed element. (It may need to use a S/370 CS, CDS or test and set instruction on the dequeueing lock 11 in order to obtain the lock in view of other potentially contending CPUs that operate asynchronously and may also be requesting the dequeueing lock 11.)

Figure 2:
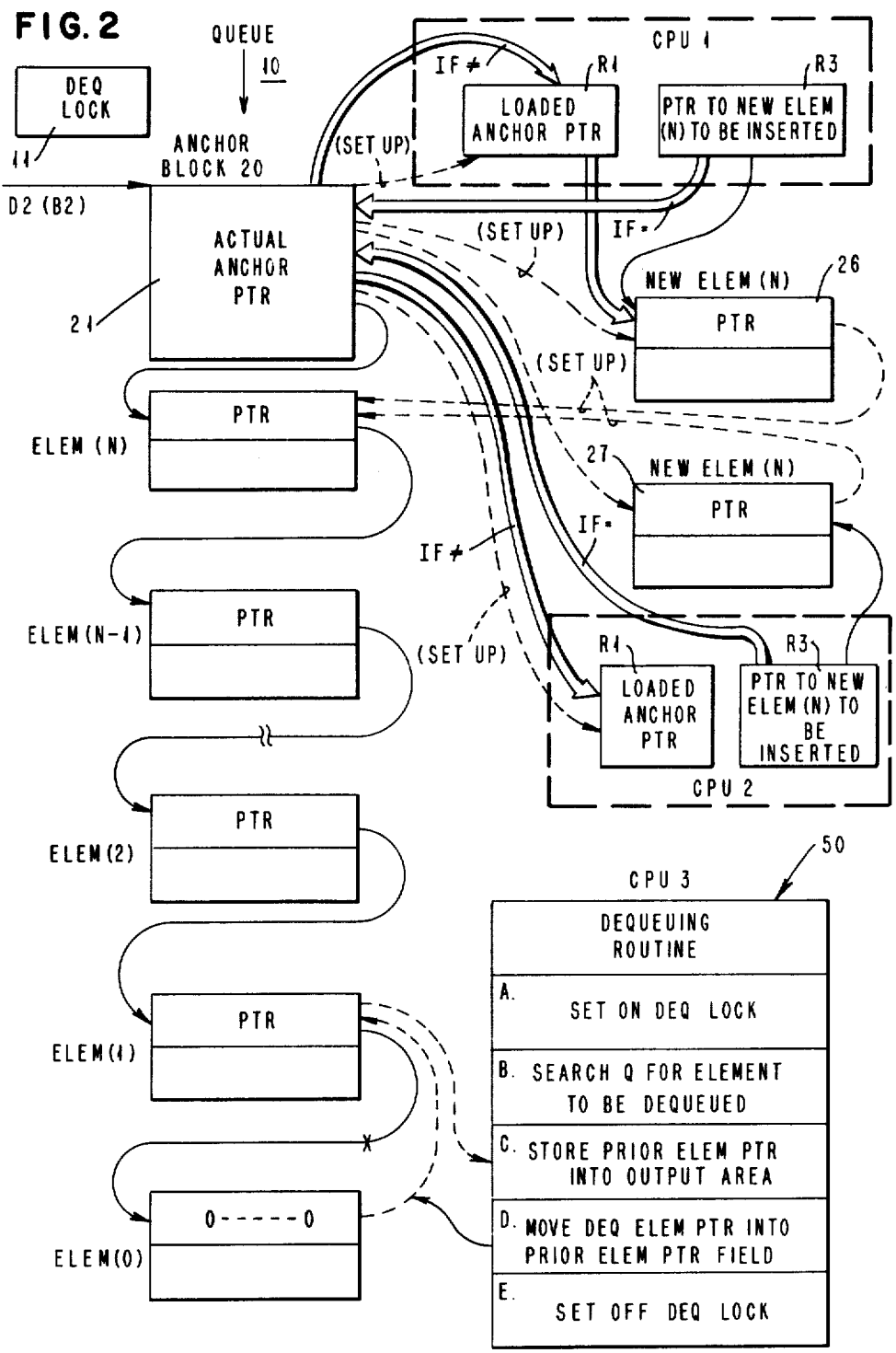
FIG. 2 is a diagramatic example of queue operations under the invention, representing three programs executing on three CPUs that are concurrently processing two insertions and one deletion of elements on the same queue.

FIG. 2 is a structural example of processes which may be operating concurrently for inserting and deleting elements in queue 10, which comprises an anchor block 20 and elements N through 0 which are chained to anchor block 20 by pointers contained in the anchor block and in each queue element N to 0. The anchor pointer 21 is an address that locates the anchor-pointed element N in the queue. The anchor-pointed element N is the element directly addressed by an address contained in the anchor pointer.

The pointer (PTR) in anchor-pointed element N locates the next queue element (N−1) in MS, the pointer in element (N−1) locates the next queue element etc., until the last element 0 is located in queue 10. The last element 0 is recognized by a special code in its pointer field that is shown in FIG. 2 as an all zeroes field. Any number of elements may be in queue 10 at any time, including no elements in which case the anchor pointer 21 is set to all zeroes. Thus, the chained order of elements in queue 10 is from the newest element N to the oldest element 0.

Each element inputted into queue 10 is inserted as an anchor-pointed element N, which causes the previous anchor-pointed element to become element (N−1) in the logical sequence of elements in queue 10. The anchor-pointed element N is considered to be at the beginning of the queue 10 and logically closest to the anchor, while element 0 is considered to be at the end of queue 10 and logically the furthest from the anchor.

The anchor block 20 and each element in the queue may have other well known fields contiguous with its respective pointer field to contain the element information being managed by the queue.

A field 11 (which need not be in the anchor block 20) contains a dequeueing lock which is set off (i.e. unlocked state) when it contains all zeroes and is set on (i.e. locked state) when it contains a non-zero value. The dequeueing lock may be set by a queue accessing program which calls a dequeueing routine and passes the dequeue lock in which case the dequeueing routine is considered to "hold the dequeueing lock".

The elements of queue 10 may be located in different areas of MS and rarely will be physically contiguous with other elements of queue 10. Thus, the elements may be widely scattered anywhere in MS, since they are located in queue 10 by the chain of pointers in the elements beginning with the anchor pointer 21. Accordingly, the anchor-pointed element N need not be physically close to anchor block 20.

Queue accessing programs interface to queue 10 by knowing the MS address of anchor block 20 and the index therein of anchor pointer 21. Through the anchor pointer 21, an element deletion routine in any queue accessing program can find any element in queue 10 using its chain of pointers for searching through the queue.

Queue 10 is generated and maintained in system main storage by queue element insertion and deletion routines included independently in the different programs represented in FIG. 1 needing queue services which may be executed on any of the plural CPUs in an MP, wherein any CPU can put elements onto the queue and take elements off the queue.

In FIG. 2, three CPUs 1, 2 and 3 are simultaneously executing queue accessing programs in which CPUs 1 and 2 are each independently executing queue insertion routines attempting to insert new anchor-pointed elements into queue 10 and CPU3 is concurrently executing a queue deletion routine 50 attempting to delete a non-anchor pointed element, e.g. element (0), in queue 10. One of the CPUs 1 or 2 will first be successful in inserting a new element N, and then the other CPU will insert another new element N, and these two new elements will become the N and (N−1) elements in queue 10.

In more detail, each insertion routine operating in FIG. 2 will have set up its respective new elements 26 and 27, and then loaded its respective CPU's general registers R1 and R3 as the operands of a compare and swap (CS) instruction. That is, each R1 receives the address in anchor pointer 20, which is located in MS at address D2(B2) known to all users of queue 10. R3 in each CPU1 and 2 is loaded with the MS address of the newly set up element 26 or 27, respectively, by the respective insertion routine. Each insertion routine may be similar to the prior art routine previously herein described for insertion of an element in a queue without locking the queue, which is flow diagrammed in FIG. 3, except that no counter field is used with insertion or deletion operations in FIG. 2 as is done in the prior art.

In FIG. 2 a dequeueing routine 50 simultaneously operates to delete an element from queue 10. Dequeueing routine 50 must first hold a dequeueing lock on queue 10, which is held by routine 50 until its operation is completed. The dequeue lock 11 may be set on by either the dequeueing routine or by a routine that calls the dequeueing routine and passes the set on the dequeueing lock.

In FIG. 2 the dequeueing routine 50 is shown as dequeueing a non-anchor-pointed element for a non-LIFO operation. However, the invention will allow any element on the queue, including the anchor-pointed element, to be dequeued by dequeueing routine 50.

The preferred dequeueing lock uses a programming convention among all user programs which may execute queue deletion routines on the MP, whereby they examine the state of a lock field for a queue before attempting to make any element deletion in the queue, and whereby they do not make a deletion from the queue whenever they find the lock field set on with a non-zero value.

The convention does not require user programs which may execute queue insertion routines to examine the state of the lock field.

When using the convention in the preferred mode of operation, the dequeueing lock field may be examined by a user program before it calls the dequeueing routine. If the user routine finds the lock is set off, it may set the lock on by storing therein a lock code assigned to the user routine, which may be a non-zero user identifier code. The user routine may then call the dequeueing routine, and pass it to the dequeueing lock address. Then the dequeueing routine may make an initial test of the lock state to test for the correct lock code before it attempts to perform any dequeueing operation. After the element deletion by the dequeueing routine is completed, the routine must reset the lock field to its off state, i.e. to all zero value. Thus, the lock off code will indicate to any other user program examining the lock field that the queue is available for another queue deletion routine operation.

However, even though the dequeueing lock is set on, it does not prevent a concurrent element insertion, since this convention does not require any insertion requesting routine to examine the state of the dequeueing lock field. Hence an element insertion operation can occur simultaneously with an element deletion operation without compromising the integrity of the queue even while the dequeue lock is held, whereby new elements may be inserted at the anchor end of the queue by any number of element insertion routines operating simultaneously.

During locked dequeueing, any user criteria can be used for searching a queue for a required element and it may be provided within a dequeueing routine. For example, a priority indicator may be provided at a known location index in each queue element, and then a dequeueing routine may specify a particular priority indicator as a search argument that looks for the first element to be found in the queue containing the specified priority.

For example, while searching the queue for an element with a given priority, each next element is sequentially located in the queue chain sequence, and its priority field is compared with a specified priority for equality. The search is stopped when the specified priority is found in any element, and that element which is dequeued to complete the dequeueing operation.

An alternative example of a dequeueing operation may require the dequeueing of all of the elements having the requested priority, wherein the search continues until the last element in the queue is searched.

Hence, in FIG. 2, the holding of the dequeueing lock by the program in CPU3, for example, does not prevent anchor-pointed elements from being concurrently enqueued by CPU1 or CPU2. The dequeueing lock ensures that only one CPU is currently in the process of a dequeueing operation on the same queue.

Thus, the dequeueing routine executing in CPU3 in FIG. 2 includes the basic steps of:

A. Holding the lock field to communicate to other users that queue 10 is being used for a dequeueing operation.

B. Searching queue 10 for finding an element to be dequeued.

C. Outputting any found element by storing its address in an output area of the dequeueing routine. The address to the found element is the pointer in the prior element in the queue chain which addresses the found element which is to be dequeued.

D. Moving the pointer within the found element into the pointer field in the prior element, so that the prior element pointer thereafter addresses the element that followed the found element. This operation dequeues the found element by eliminating the pointer to it in the queue chain so that it is no longer addressed in the queue. If an anchor-pointed element is being dequeued, the prior element does not exist, and the anchor pointer must be changed, using a CS instruction, to the pointer in the dequeued anchor-pointed element to address the element that followed the dequeued. The CS instruction is needed to ensure the integrity of the queue against changes to the anchor pointer by any simultaneous enqueueing operation on another CPU.

E. Setting off the lock field to communicate to the other users programs that queue 10 is no longer being used for a dequeueing operation, and therefore is available for another dequeueing operation by the first user program to thereafter set on the lock field.

For example, in FIG. 2, CPU1 may be executing an insertion routine, and CPU2 may be simultaneously performing another insertion routine comprised of similar object code.

In more detail, every insertion or deletion routine, is performed by first accessing the content of the anchor pointer 20 in FIG. 2 to locate the anchor-pointed element at the beginning of the queue.

A dequeueing search must also access the pointer in the anchor-pointed element to find the next element in the queue, and repeat these steps to find each next element, and so forth, until the required element is found or until a zero pointer is found to indicate the end of queue 10. An example of a special deletion routine which may be executed by CPU3 is provided by the object code of the following System/370 assembler language routine that demonstrates the technique for FIFO unstacking an element from a queue:

|  |  |  |  |
|---|---|---|---|
| * | (A lock is held to prevent more than one | | |
| * | execution of this code at a time.) | | |
| * | (The pointer field of an element is assumed | | |
| * | here to be the first word of the element.) | | |
|  | SR | 0,0 | Register 0 is set to zero. |
|  | L | 4,ANCHOR | Address of first element is put in GR4. |
|  | LTR | 4,4 | Is there any element on the queue? |
|  | BZ | NOELEM | Branch out if no element. |
|  | C | 0,0(0,4) | Is there a second element? |
|  | BNE | FINDLOOP | Yes, go find end of the list. |
|  | CS | 4,0,ANCHOR | Attempt to zero the anchor. |
|  | BZ | DONE | Unstack complete. |
| * | (If the anchor changes, we know that it was | | |
| * | because a new element was added, and therefore | | |
| * | there are two or more elements now on the list. | | |
| * | It is therefore unnecessary to test for an | | |
| * | empty or single-element list again. Register 4 | | |
| * | is now the address of the first element on the | | |
| * | list.) | | |
| FINDLOOP | LR | 3,4 | GR3 remembers previous element address. |
|  | L | 4,0(0,4) | Load GR4 with pointer in next element. |
|  | C | 0,0(0,4) | Is the next element the last element? |
|  | BNZ | FINDLOOP | No, keep looking for the last element. |
|  | ST | 0,0(0,3) | Set prior element pointer field to zero when the next element is the last. |
| DONE | DS | 0H | Register 4 contains the address of the dequeued element. |
| (The non-LIFO lock is now released.) | | | |

Figure 5:
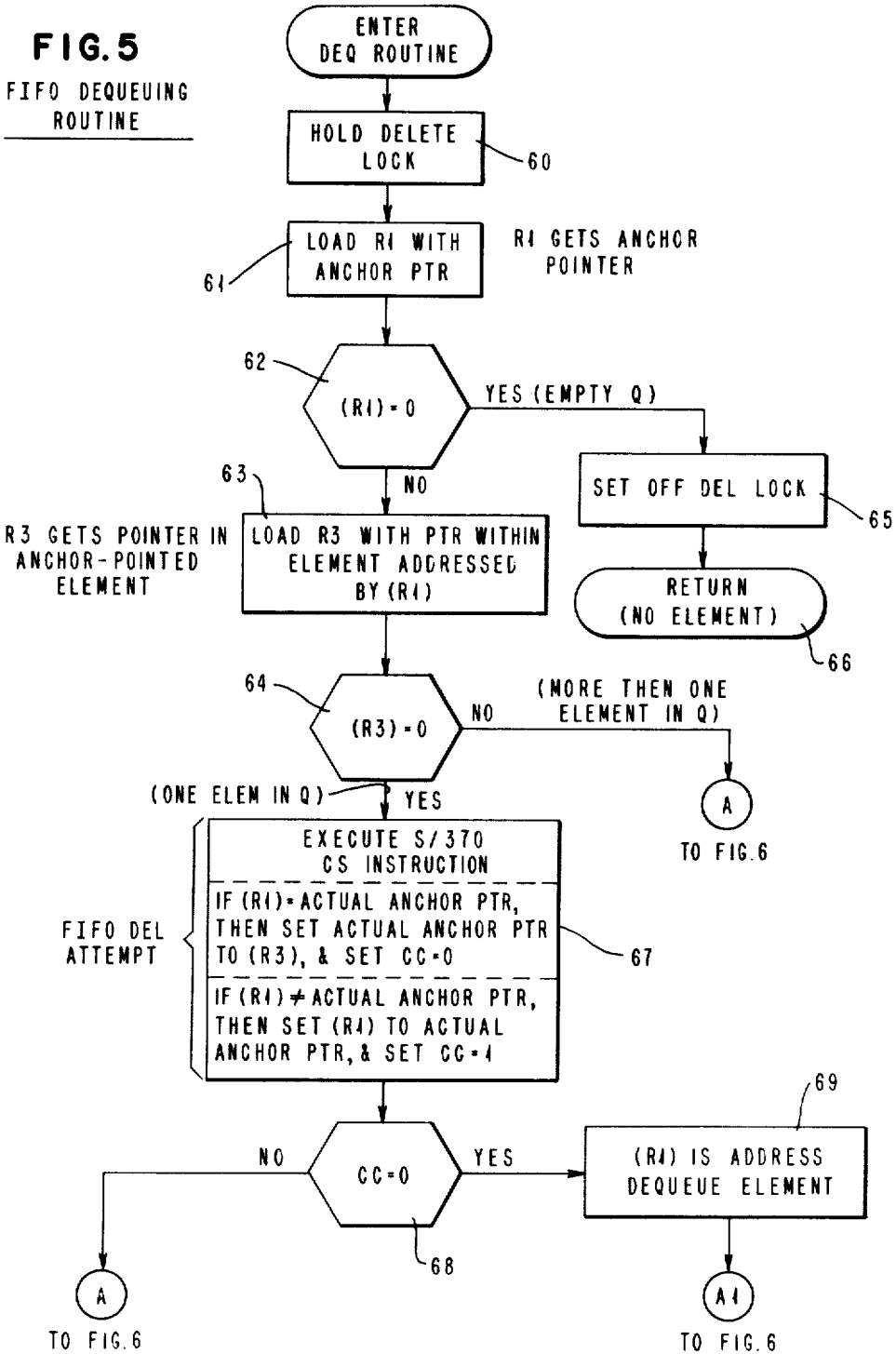
FIGS. 5 and 6 represent a FIFO dequeueing method embodiment which may be used in the invention.
Figure 6:
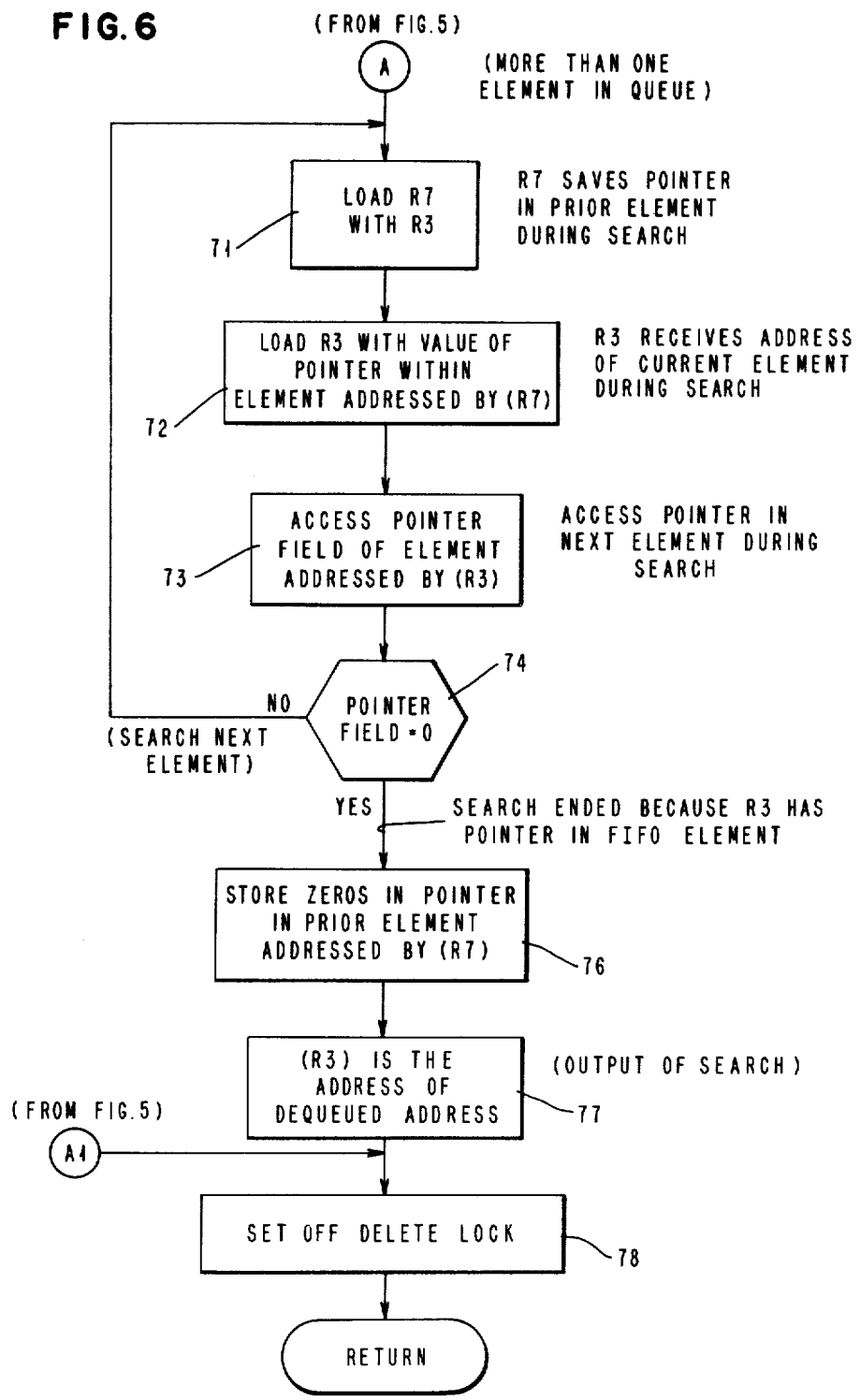

FIGS. 5 and 6 provide a flow diagram of a similar FIFO dequeueing routine, in which step 64 in FIG. 5 determines if there is more than one element in the queue; and if there is only one element, step 67 attempts to delete it from the queue. Steps 61, 62, 63, 68 and 69 are self explanatory.

FIG. 6 searches the queue for the last element in its chain. As each next element is sequentially located, steps 71 and 72 save in R7 and R3 the addresses of the current element and its prior element. The prior element's address in R7 is retained in case step 74 should find the next element (addressed by the current element pointer in R3) to be the found element. Then step 76 moves the pointer field (all zeroes) from the found element into the prior element addressed by the content of R7. Step 77 indicates the output address of the dequeued element is in R3. Then step 78 sets off the non-LIFO delete lock field.

It is important to note in FIGS. 5 and 6 that after step 61 of FIG. 5, the dequeueing program is assured that the chain of elements can be searched without being exposed to the chain of elements changing from the anchor-pointed element identified in step 61 to the last element of the queue. Since the dequeueing lock must be held to delete an element, none of the existing elements can be deleted by a program on another CPU while this dequeueing program holds that lock. New elements can, however, be added by enqueueing routines operating on a plurality of other CPU's, by inserting succeeding anchor-pointed elements as described previously. Inserting new elements, however, does not affect the chain of elements between the first-identified anchor-pointed element and the last element on the queue.

Figure 7:
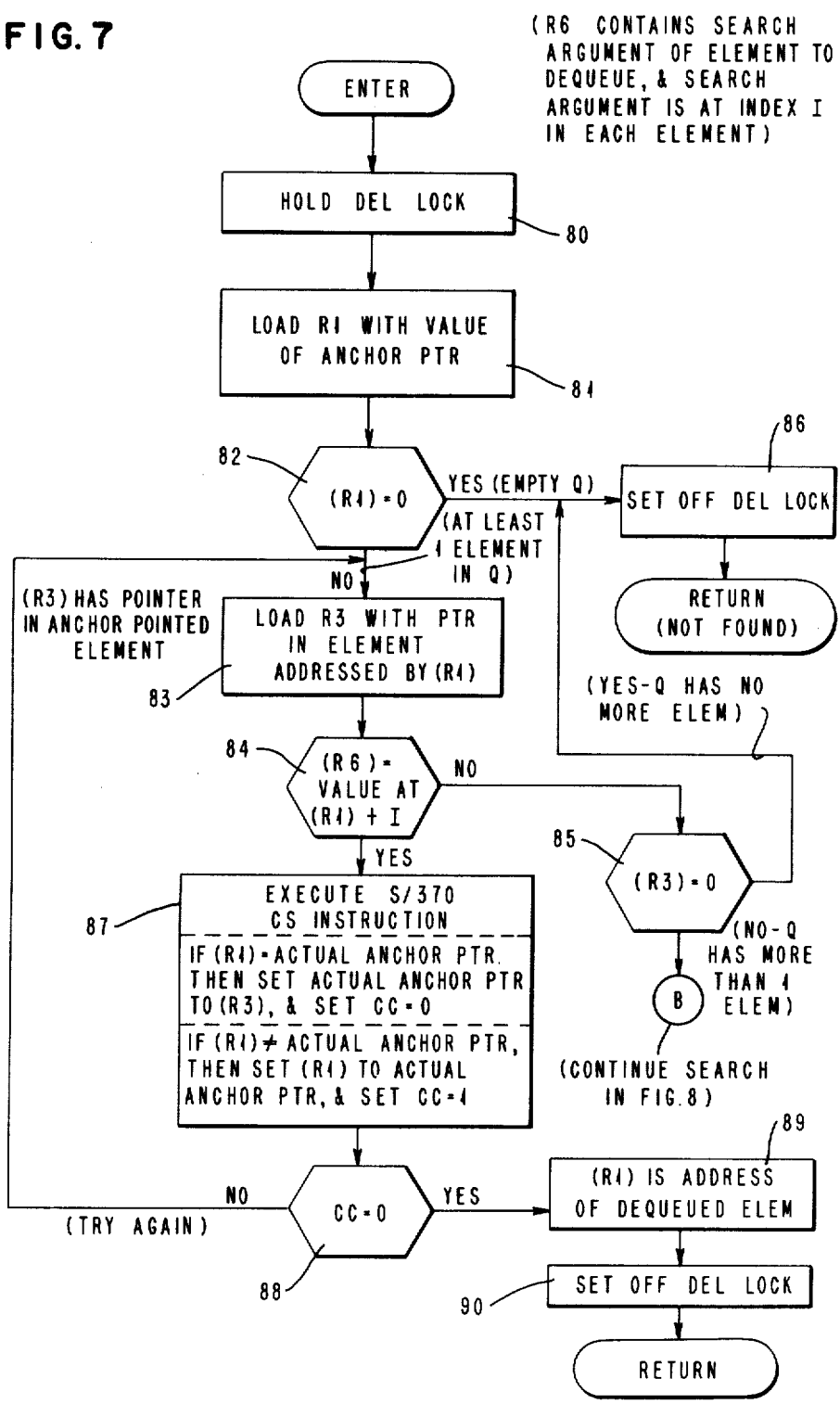
Figure 9:
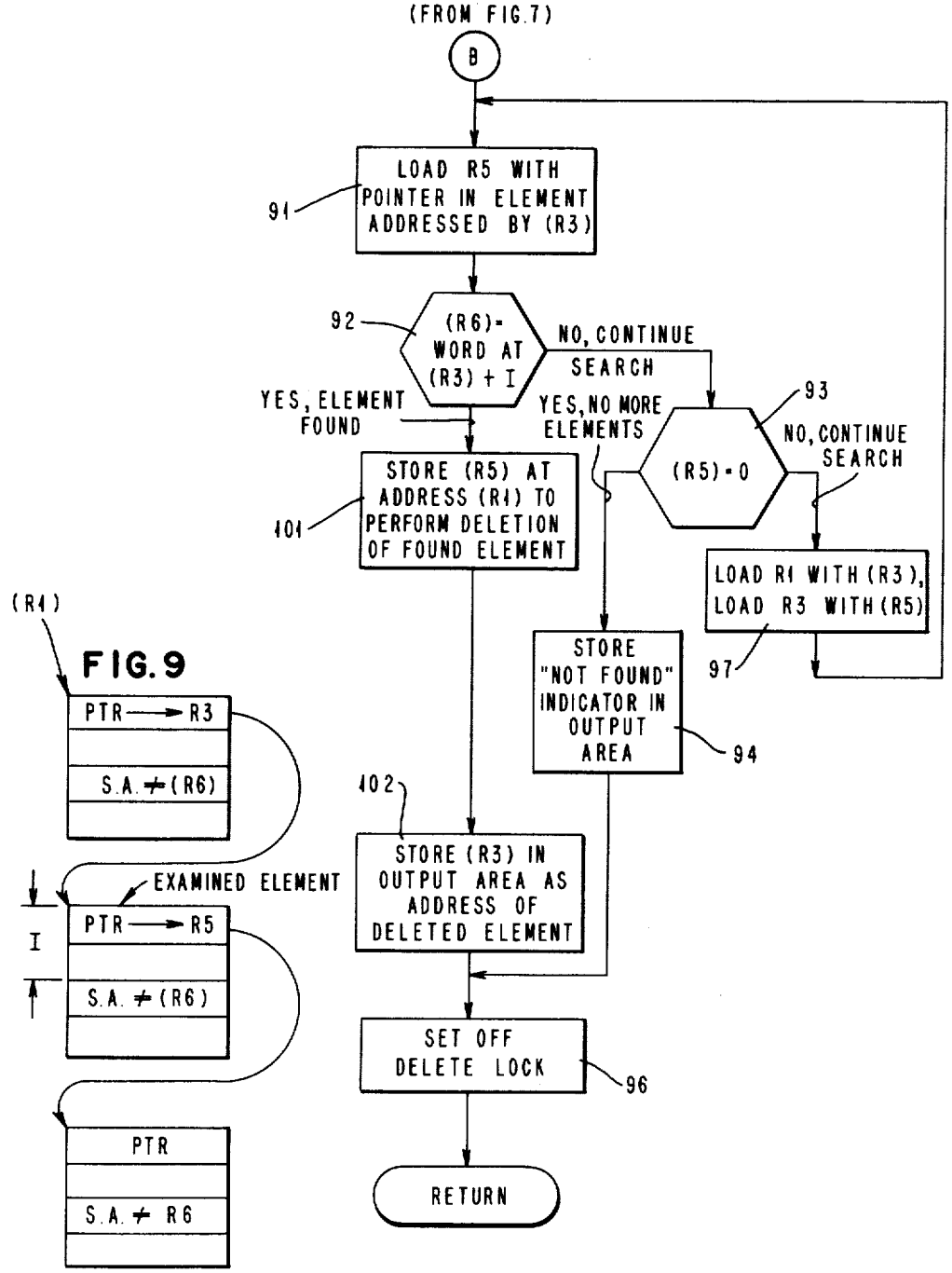
FIG. 9 illustrates a part of a queue being examined during an iteration of the method represented in FIG. 8.

FIGS. 7 and 8 are flow diagrams of a deletion routine which dequeues the first element in the queue found to contain a selection parameter equal to a search argument specified in a general register R6. The selection parameter in each element in the queue is located at an index I from the beginning of each element which is addressed by the pointer in its prior element in the queue chain, as shown in FIG. 9.

FIG. 7 is entered from, or contained in, the program needing to delete an element on queue 10, after R6 has been loaded by the program with the search argument. Initial step 80 holds the deletion lock by either receiving the lock in a state which was set on by the calling program, or setting on the lock if it is received in off state. The on state of the deletion lock will prevent any other program from changing the current anchor-pointed element or any element of the queue. (The lock will be set off on any exit from the dequeueing routine.) The anchor pointer is loaded into R1 by step 81. Step 82 then tests the loaded anchor pointer value for an empty queue. If the queue is empty, the deletion lock is set off and a return is taken to the calling program. If not empty, step 83 loads R3 with the pointer within the anchor-pointed element addressed by the content of R1. Hence, R3 now has the pointer in the anchor-pointed element. Then step 84 searches the first element for the search argument, and if the first element contains the search argument, step 87 attempts to make its deletion. Step 88 determines if the deletion is successful, and if so, step 89 indicates R1 contains the address of the dequeued element, the lock is set off and a return is taken to the calling program.

But if step 84 finds the first element does not have the search argument, step 85 tests the pointer in R3 to determine if it is the last element, i.e. for a zero value. If there is not more than one element on the queue, the search is ended, and the routine resets the lock off and returns to its calling program.

However, if more than one element is found in the queue by step 85, and the first element is found by step 84 not to be the required element, then FIG. 8 is entered at point B.

FIG. 8 continues the search of queue 10 beginning with the second element in the queue and ends when either: (a) an element is found containing the search argument, or (b) the end of the queue is reached (i.e. the element with an all zero pointer) indicating no element contains the search argument.

FIG. 9 represents the part of queue 10 currently being searched during any iteration of the process of FIG. 8, which is being addressed by the content of R1. During any iteration, general register R3 is loaded with the address of the current element being examined during that iteration; general register R5 is loaded with the pointer in the currently examined element, which pointer addresses the next element in queue 10 that will be examined in the next iteration if the element currently being examined is not found to be the element to be deleted or is not the last element in the queue.

When step 91 is first entered in FIG. 8, R1 contains the address of the anchor pointed element and R3 contains the pointer in the anchor-pointed element. Then step 91 loads R5 with the pointer in the anchor-pointed element. Step 92 tests the search argument in the element currently being examined (i.e. addressed by R3) to determine if it is the required element. If not, step 93 tests its pointer in R5 to determine if it is the last element in the queue (e.g. all zero pointer field). If it is the last element in the queue, step 94 is entered to store a "not found" indicator in an output area, step 96 is entered to set off the delete lock, and a return is taken to the calling program which can access the output area to find the result of the search as "not found".

If step 93 finds the current element being searched is not the last element, then step 97 is entered to continue the search by loading R1 with R3 and R3 with R5. An iteration from step 97 back to step 91 occurs for each element examined and found not to be the required element, until step 93 detects that the last element in the queue has been examined.

Thus, step 92 compares the search argument in the currently examined element to its field located at index I. If not equal, step 93 is entered. However, if equal, step 101 is entered to delete the found element currently having its address in R3. This is done by step 101 storing the pointer within the element being deleted (i.e. in R5) into the pointer field of the prior element being addressed by the content of R1. Then step 102 is entered to store the address of the found element from R3 into an output area assigned to receive the address of the element being deleted. Then step 96 sets off the deletion lock, and a return is made to the calling program.

The deletion routine in FIGS. 7, 8 and 9 can easily be modified to always examine all elements in the queue for the search argument, and to dequeue all the found elements having the search argument during a single search operation. For example, all elements having a given priority value may be dequeued, which may involve two or more elements being dequeued in response to a single dequeueing request.

Although this invention has been shown and described with respect to plural embodiments thereof, it should be understood by those skilled in the art that various changes and omissions in the form and details of the invention may be made therein without departing from the spirit and the scope of the invention.

Having thus described my invention, what I claim as new and desire to secure by Letters Patent is:

1. A method of controlling a queue of address chained elements beginning with an anchor-pointed element, each element comprising a block of bytes located in a main storage any where relative to any other element in the queue, the main storage being in a data processing system having one or more CPU's, each element containing a pointer to a next element in the queue except the last element in the queue containing an end of queue indicator, the queue having an anchor block containing an anchor-pointer for providing an address that directly enables the addressing of an anchor-pointed element, a plurality of processing being capable of simultaneous execution in the system, comprising:

providing a dequeueing lock for permitting the dequeueing of any element in the queue,
obtaining the dequeueing lock in a set-on state prior to deletion of any element in the queue,
ignoring the state of the dequeueing lock for the insertion of an anchor-pointed element into the queue by a compare and swap type of CPU instruction,
whereby a plurality of simultaneously executing processes may be inserting anchor-pointed elements into the queue while another simultaneously executing process may be deleting any element in the queue.

2. A method as defined in claim 1, further comprising:
searching for a search argument in the chained elements in the queue for finding a required element while the dequeueing lock in a set on state has been obtained by the obtaining step,
outputting and dequeueing any element found by the searching step,
whereby a locked dequeueing process is performed for dequeueing a required element found by the searching step, while one or more non-locked enqueueing processes may be performing for enqueueing successive anchor-pointed elements onto the queue.

3. A method as defined in claim 2, further comprising:
inputting a search argument to the searching step for searching the chained elements in the queue for the search argument beginning with the anchor-pointed element,
outputting at least the pointer addressing an element found in the sequence of chained elements by the searching step to have the search argument.

4. A method as defined in claim 2, further comprising:
specifying a last element identification means for recognizing a last element in the sequence of chained elements of the queue,
the searching step accessing each element in the queue to detect the last element identification means,
the outputting and dequeueing steps outputting and dequeueing a required element found by the searching step to have the last element identification means,
whereby a FIFO dequeueing operation is performed for dequeueing the required last element from the queue while permitting simultaneous enqueueing of element(s) onto the queue.

5. A method as defined in claim 4, further comprising:
assigning a plurality of general registers (GRs) to a process in any CPU in the system which is to execute a process for inserting or deleting an element in the queue including first, second and third GRs for respectively storing the addresses of three consecutive elements in the sequence of address chained elements in main storage,
executing the obtaining step for a dequeueing process in one CPU to hold the dequeueing lock in set-on state,
initially loading the first GR in the one CPU with the anchor-pointer and then loading the second GR in the one CPU with the pointer in the anchor-pointed element,
testing the contents in the first and second GRs in the one CPU for any end-of-queue indication therein,
loading the third GR in the one CPU with a pointer from within the next element in the queue addressed by the content of the second GR,
testing the content of the third GR for determining if the next element is or is not the last element in the queue, and
performing the outputting and dequeueing step on the next element if it is a requested element when the testing step has determined the next element is the last element in the queue,
accessing a pointer in another next element addressed by the pointer in the third GR when the testing step determines the pointer in the third GR does not address the last element in the queue, reloading the first, second and third GRs respectively with the contents of the second GR, third GR, and pointer accessed by the accessing step, repeating the testing step and any steps following the testing step until the performing step outputs and dequeues a requested element or until the testing step finds the end of the queue is reached and no requested element is found in the queue, and simultaneously executing an insertion process in any one or more other CPU's in the system to simultaneously insert one or more anchor-pointed elements into the queue.

6. A method as defined in claims 2, 3, 4 or 5, further comprising:

setting off the dequeueing lock after the outputting and dequeueing step is executed.

* * * * *